April 9, 1935. M. T. WESTON 1,997,284
ADJUSTABLE CHAIN DRIVE
Filed May 8, 1934 2 Sheets-Sheet 2
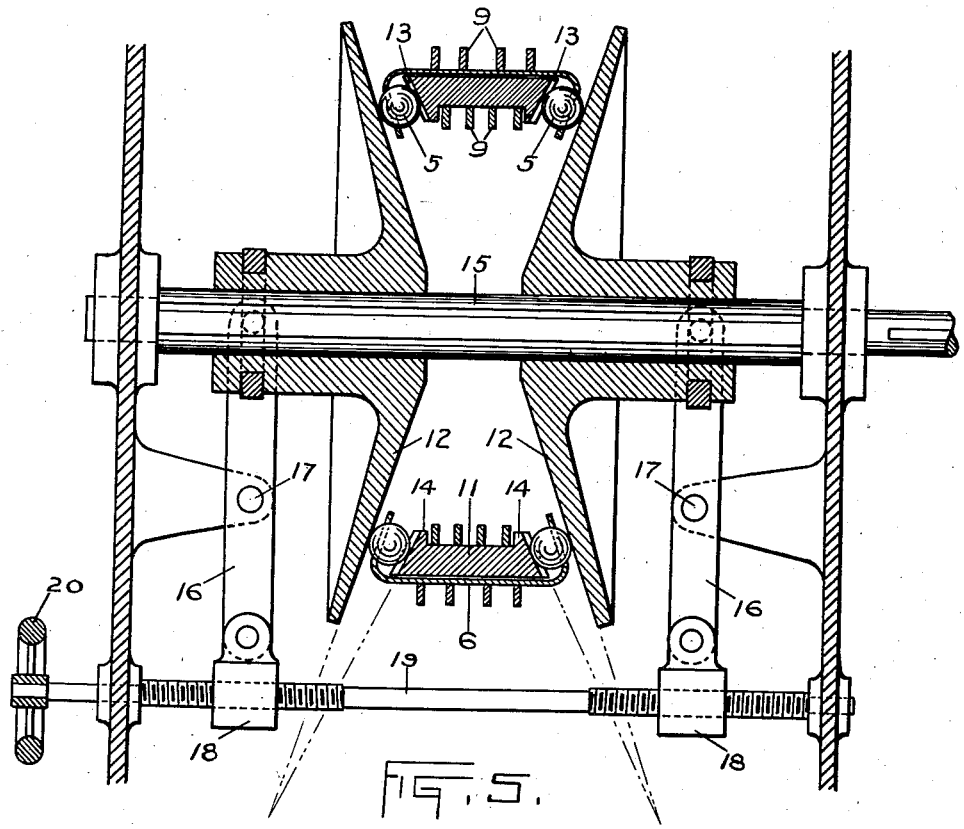
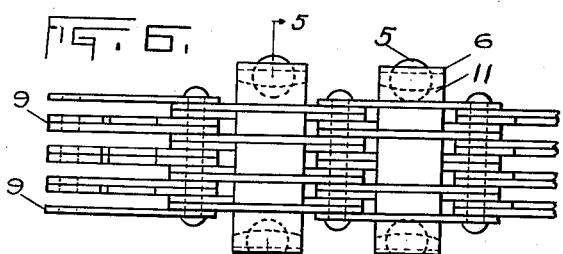
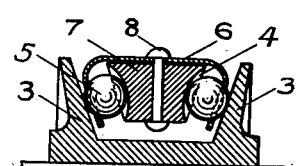
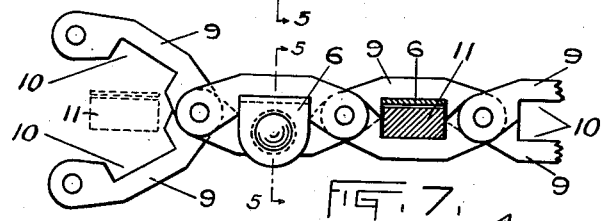
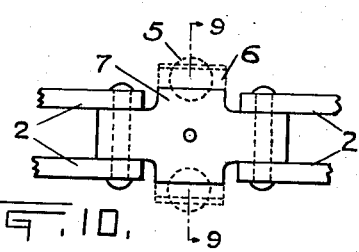
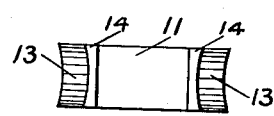
INVENTOR
Milton T. Weston Patented Apr. 9, 1935

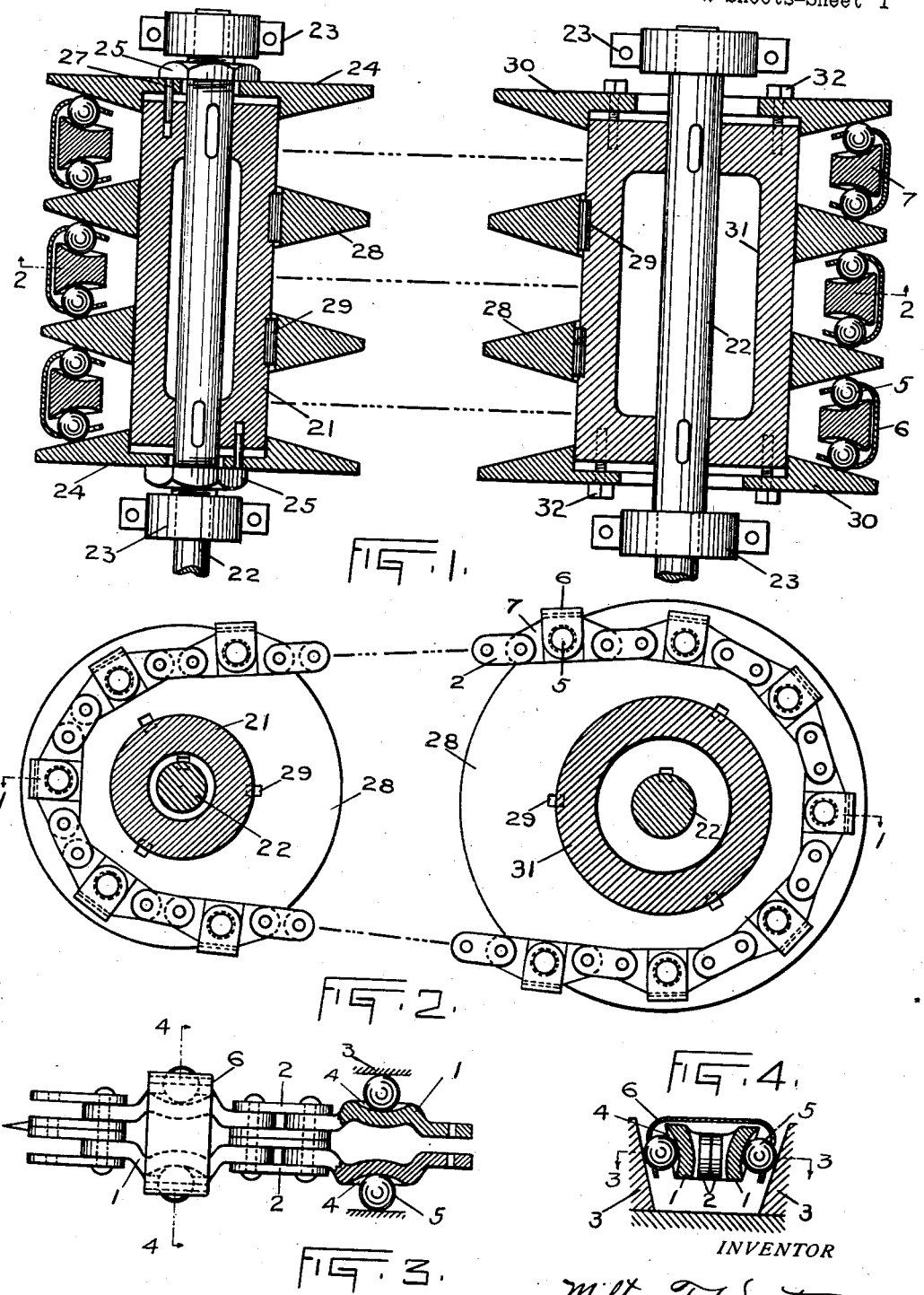

1,997,284

UNITED STATES PATENT OFFICE 1,997,284

ADJUSTABLE CHAIN DRIVE

Milton T. Weston, Keansburg, N. J.

Application May 8, 1934, Serial No. 724,501

5 Claims. (Cl. 74—245)

My invention relates to improvements in adjustable chain drives and has for its principal object to provide a drive of this character wherein the driving chain has only frictional engagement with the driving and driven members instead of being positively driven by teeth as by a sprocket wheel. Another important object is to provide driving and driven members which will permit the use of a plurality of relatively small driving chains and which automatically adjust themselves by the tension in the driving chains so that each chain takes its exact proportion of the driving stress. A further object is to provide means for adjusting the driving and driven members so that the ratio of the two members may be changed by extremely small increments if desired. Other objects and advantages will be pointed out and will be fully described in the following specifications and are clearly shown in the accompanying drawings in which similar reference numerals refer to similar parts in all of the views.

Fig. 1 is a sectional plan view of my invention and is taken on a line 1—1 of Fig. 2.

Fig. 2 is a sectional elevation taken on a line 2—2 of Fig. 1, the driving chain being shown in elevation.

Fig. 3 is a plan view of one type of construction of the driving chain. The part in section is taken on a line 3—3 of Fig. 4.

Fig. 4 is a sectional view of the chain shown in Fig. 3 and is taken on a line 4—4 of that figure.

Fig. 5 is a sectional view showing another type of construction of the driving chains in my invention. The chain sections are taken on a line 5—5 of Figs. 6 and 7. The view shows the chains used in connection with adjustable tapered driving or driven discs.

Fig. 6 is a plan view of the driving chain shown in Fig. 5.

Fig. 7 is a side view of the driving chain shown in Fig. 6.

Fig. 8 is a detail view of the compression bar. It is a plan view of the lower bar in Fig. 5.

Fig. 9 is a sectional view showing the adaptation of my invention to the "bar" type of chain. The section is taken on a line 9—9 of Fig. 10.

Fig. 10 is a plan view of the "bar" type of chain shown in Fig. 9. The balls and retainer are indicated by dotted lines.

Fig. 11 is an inverted plan view of the "bar" link shown in Fig. 10.

In carrying out my invention in its preferred form, I employ a series of relatively small driving chains each composed of a plurality of articulated power transmitting links, either with or without plain connecting links. Co-operating with these power transmitting links are oppositely disposed hardened and ground steel balls of commercial make, held in operative position on either side by means of spring retainers. The driving and driven members, with which these chains are used, are composed of drums or sheaves having V type grooves similar to the multi V type drive now in common use, except that the grooves in applicant's drive are preferably adjustable, the intermediate flanges being free to move axially. The fabric and rubber V belts used in the "multi V type" drive operate fairly satisfactorily in parallel because of their elasticity but have a relatively short life.

It has never been considered practicable to run a series of link belts or chains in parallel over sprocket wheels because of the commercial impossibility of making a series of chains of exactly equal lengths and because of the unequal wear in service, which would cause one chain to take more than its share of the load. In applicant's drive the driving chains will run on an infinite number of pitch diameters since there are no teeth requiring certain fixed pitch diameters. Therefore applicant's chain accurately adjusts itself to any required pitch diameter and thus automatically compensates for any inaccuracy of manufacture or for any inequalities of wear. Extreme accuracy is therefore not essential in applicant's drive as illustrated in Figs. 1 and 2 which will be described herein later. The driving chains and the principle upon which they operate will now be described.

In Figs. 3 and 4 I show the pressed type of power transmitting link comprising two separate side members 1 which are assembled in articulated form with plain links 2 as in Fig. 3. It will be seen that the central portion of each side member 1 is extruded or pressed outwardly with respect to the center of the chain, the outer surfaces of the extruded or pressed portions being substantially parallel to the co-operating surfaces of the tapered driving or driven flanges 3. In the outer surface of the extruded portion of each link 1 is a shallow spherical depression or recess 4. Steel balls 5 are held in opposing positions, normally in the center of the recesses 4, by the spring retainers 6 which are shaped approximately as shown in the several views. The ends of the retainers 6 have holes opposite the balls 5, somewhat smaller in diameter than the diameter of the balls, which allows the balls 5 to protrude slightly through the retainer 6 and come in contact with the co-operating flanges 3 of the driving and driven members as clearly shown in Fig. 4. Because of the spring-like action of the retainer 6, it can simply be snapped into position and thus yieldingly hold the balls 5 approximately in their normal location at the center of the recesses 4. When the balls 5 are moved out of their normal positions in the manner to be referred to later herein, the tendency of the spring retainers 6 is to return them to that normal position.

In Figs. 9, 10 and 11 I show my invention adapted to the "bar" type of chain. This is similar to the type shown in Figs. 3 and 4 just described except that the power transmitting links 7 are cut or forged from a single piece and are joined in articulated relation by means of plain links 2. The central portion of the power transmitting link 7 is shown with tapered sides which are substantially parallel to the sides of the tapered flanges 3 with which the chain co-operates. A top plan view of the bar link 7 is shown in Fig. 10 with the balls 5 and retainer 6 dotted in their normal relation thereto. Fig. 11 shows an inverted plan of the bar link 7 and also shows the circular recesses 4 in the tapered faces of the central portion. In the projection these shallow circular recesses 4 appear eliptical. In Fig. 9 I show the retainer 6 attached to the bar link 7 by means of a rivet 8. In this same figure I show the tapered flanges 3 integral with the drum or sheave. This will operate satisfactorily where only one strand of chain is used and where no adjustment is required. The two types of chains just described may be termed single strand chains because they cannot satisfactorily be increased in width by adding links in parallel without imposing excessive bending stresses in the pins of the articulated joints.

The type of chain shown in Figs. 5, 6 and 7 embodying my invention may, however, be built up to any required width and is constructed as follows: The chain proper comprises a plurality of articulated links 9 each shown with a notch 10 in one side so located that when the links 9 are assembled in the chain with the notches 10 toward the center of the chain, rectilinear transverse openings will be formed through the chain parallel to and substantially midway between the articulated joints as clearly illustrated in Fig. 7. In the transverse openings thus formed through the links 9, I show transverse compression bars 11 adapted to be retained in position by the links 9. These compression bars 11, so termed because they take the compressive stresses due to the jamming action of the balls 5, relieve the chain proper of all stress except that due to normal driving conditions. In the two types previously described it will be seen that the power transmitting links 1 and 7 are subjected to this compressive stress. This is the essential difference in construction which makes it possible to increase the width of the chain and the size of its members to get any practical horse power output. I show the ends of these compression bars 11 beveled at a slight angle with respect to the driving or driven discs 12. The apex of this acute angle is away from the center of the discs 12 as shown by the dotted lines at the bottom of Fig. 5. In the beveled ends of the compression bar 11 I show a different type of recess 13 which takes the form of a shallow concave groove as clearly shown in Fig. 8. Balls 5 are held in co-operative relation to the ends of these transverse compression bars 11 by the spring retainers 6 which snap into position, holding the balls 5 substantially in the position shown in Fig. 5, and forming a unit which is placed in the transverse openings in the chain and which may have a relatively slight endwise movement limited by the shoulders 14, on the underside of the transverse compression bars 11.

The action of the balls 5, as used in the several types of chains described is as follows. In Figs. 3 and 4 and in Figs. 9, 10 and 11, it will be seen that the center of the recesses 4 in the sides of the power transmitting links 1 and 7 is exactly the diameter of the ball from the co-operating surface of the tapered flanges 3. Obviously the rim or edges of the recesses 4 must therefore be less than the diameter of the ball from the co-operating surfaces of the tapered flanges. Any movement of the chain with respect to the tapered flanges will instantly roll the balls into a jammed position between the links and the tapered flanges so that no further relative movement can take place. Since all parts are hardened and practically non-compressible, a very slight relative movement is all that is necessary to bring about this locked relationship. On account of the very acute angular relation between the walls of the recesses 4 and the faces of the tapered flanges 3, the tendency of the balls 5 is always to roll,—never to slip. The chain or other parts of the drive will fail before the chain will slip on the driving or driven members. The action of the balls in Fig. 5 is very similar. As the chain comes into contact with the driving or driven member, the transverse bars 11 move radially toward the center until the balls 5 roll into jammed position between the ends of the transverse compression bars 11 and the tapered driving or driven discs 12. The tangential stress in the chain due to the transmission of power will cause a tendency of the balls to roll up the concave sides of the groove 13 in the ends of the transverse compression bars 11 and come into jammed relation here also. The locked position which the balls will take in all cases will depend upon the direction of the stress resulting from the combined radial and tangential stresses.

As before stated, the type of chain illustrated in Figs. 5, 6, 7 and 8 can be built up to any required width and strength and will therefore usually be used as a single driving unit as illustrated in Fig. 5 where it is shown in connection with a pair of axially adjustable tapered discs 12 similar to those used in the well known Reeves variable transmission. The use of my all metal chain in place of the present rubber belt with cleats attached top and bottom, will permit the entire transmission unit to run in oil and thus greatly extend its life and also greatly reduce maintenance and care. In Fig. 5 the adjustable tapered discs 12 are splined on the revolvable shaft 15 and are movable axially thereon by means of levers 16 fulcrumed at 17. The free ends of the levers 16 are pivoted to nuts 18 which travel in opposite directions on the adjusting rod 19 due to the right and left hand threads on which the nuts 18 are mounted. The adjusting rod 19 may be turned by means of the hand wheel 20.

I will now describe my complete drive as illustrated in Figs. 1 and 2. The smaller member at the left may be considered as driving and the larger member at the right as being driven. In the driving member a core or drum 21 is keyed to driven shaft 22 which is mounted in suitable bearings 23. The tapered end flanges 24 are shown axially adjustable by means of the nuts 25 threaded on the driven shaft 22. The end flanges 24 are prevented from turning on the drum 21 by pins 27 driven into the said flanges and slidable in holes in the ends of the drum 21. The intermediate double tapered flanges 28 are freely slidable axially on the drum 21 but are prevented from rotating thereon by the keys or feathers 29.

The driven member is identical in construction except that the end flanges 30, on account of their larger diameter, are shown adjustably attached to the drum 31 by means of bolts 32. The adjustment of the end flanges must be made while the drive is idle and only a limited adjustment can be made by the construction shown.

The chain shown in Figs. 1 and 2 is the bar type illustrated in Figs. 9, 10 and 11 but either of the other types described can be used, especially the one shown in Figs. 3 and 4.

The operation of a single chain with a pair of plain tapered driving or driven flanges has been made clear in the foregoing description. The operation of a plurality of driving chains in parallel as in Figs. 1 and 2 is as follows. One object of my drive is to maintain an equal driving stress in each of the chains to insure long and satisfactory operation. If, for example, the chain in the center is temporarily stressed higher than the ones on either side it will crowd the double tapered flanges on either side, since they are axially movable, and thus cause all chains to gradually adjust their operating pitch diameters until the operating tension in each chain is equal. If one chain is a trifle longer than the others it will merely operate on slightly larger pitch diameters but its tension will remain substantially equal to that of the other chains.

Having thus described my invention I claim as new and desire to secure by Letters Patent:

1. A driving chain for an adjustable chain drive comprising in combination a plurality of articulated notched links assembled in opposite parallel order to form transverse openings thru said notched links as a group, and transverse power transmitting bars mounted in the transverse openings in said notched links, the ends of said transverse power transmitting bars being adapted to co-operate with rolling means which form the sole contact between the said driving chain and suitable tapered driving discs.

2. A driving chain for an adjustable chain drive, comprising in combination a plurality of articulated notched links assembled in opposite parallel order to form transverse openings thru said notched links as a group, independent transverse power transmitting bars mounted in the transverse openings in said driving chain, the ends of said transverse power transmitting bars being adapted to co-operate with independent rolling means, and independent yielding means co-operating with said power transmitting bars to maintain the said independent rolling means in operable contact with the ends thereof.

3. A driving chain for an adjustable chain drive comprising in combination a plurality of articulated notched links assembled in opposite parallel order to form transverse openings thru said notched links as a group, transverse power transmitting bars having recessed ends mounted in the transverse openings in said links, rolling means movably contacting the recessed ends of said transverse power transmitting bars, and retaining means assembled substantially in parallel relationship to said transverse power transmitting bars and adapted to co-operate therewith to maintain said rolling means in operable contact with the recessed ends of said power transmitting bars said rolling means forming the sole contact between said driving chain and suitable tapered driving discs.

4. In a power transmitting unit for a driving chain having transverse openings in the articulated links thereof said unit comprising a transverse power transmitting bar having recessed ends and being adapted for mounting in the transverse openings in the links of said chain, rolling means movably contacting the recessed ends of said power transmitting bar, and retaining means assembled substantially in parallel relationship to said power transmitting bar and adapted to co-operate therewith to maintain said rolling means in operable contact with the recessed ends of said power transmitting bar said rolling means forming the sole contact between said power transmitting bar and suitable tapered driving discs.

5. In a power transmitting unit for a driving chain having transverse openings in the links thereof said unit comprising a transverse power transmitting bar adapted for mounting in the transverse openings in said chain, recesses in the ends of said power transmitting bar the walls of said recesses having an acute angular relationship to the faces of suitable tapered driving discs, rolling means contacting the walls of said recesses and adapted to move into jammed relationship between the walls of said recesses and the faces of said tapered driving discs, and yielding means co-operating with said power transmitting bar to maintain said rolling means in operable contact with the walls of the recesses in the ends of said power transmitting bar the said rolling means forming the sole contact between said power transmitting bar and the tapered driving discs.

MILTON T. WESTON.